(12) United States Patent
Zeng et al.

(10) Patent No.: US 12,367,280 B2
(45) Date of Patent: Jul. 22, 2025

(54) COMBINED STRUCTURE AND IMPORT BEHAVIOR SIGNATURES BASED MALWARE LEARNING AND DETECTION

(71) Applicant: Palo Alto Networks, Inc., Santa Clara, CA (US)

(72) Inventors: Dongrui Zeng, Sunnyvale, CA (US); Yang Ji, San Jose, CA (US); Wenjun Hu, Santa Clara, CA (US)

(73) Assignee: Palo Alto Networks, Inc., Santa Clara, CA (US)

( * ) Notice: Subject to any disclaimer, the term of this patent is extended or adjusted under 35 U.S.C. 154(b) by 356 days.

(21) Appl. No.: 18/050,508

(22) Filed: Oct. 28, 2022

(65) Prior Publication Data

US 2024/0143753 A1 May 2, 2024

(51) Int. Cl.
*G06F 21/56* (2013.01)
*G06F 21/62* (2013.01)

(52) U.S. Cl.
CPC .......... *G06F 21/56* (2013.01); *G06F 21/6218* (2013.01); *G06F 2221/034* (2013.01)

(58) Field of Classification Search
None
See application file for complete search history.

(56) References Cited

U.S. PATENT DOCUMENTS

| | | | |
|---|---|---|---|
| 10,491,627 B1 * | 11/2019 | Su | H04L 63/145 |
| 10,521,588 B1 * | 12/2019 | Huang | G06F 21/53 |
| 11,042,637 B1 * | 6/2021 | Davis | G06F 21/121 |
| 11,176,251 B1 * | 11/2021 | Plantenga | G06F 21/564 |
| 2013/0091571 A1 * | 4/2013 | Lu | G06F 21/566 726/23 |
| 2013/0185798 A1 * | 7/2013 | Saunders | G06F 8/53 726/22 |
| 2020/0311766 A1 * | 10/2020 | Shiravi Khozani | G06F 21/53 |
| 2020/0394028 A1 * | 12/2020 | Byrne | G06F 9/45558 |
| 2021/0173927 A1 * | 6/2021 | Slipenchuk | G06F 21/566 |

(Continued)

OTHER PUBLICATIONS

"Tracking Malware with Import Hashing", [online], [retrieved on Oct. 27, 2022] Retrieved from the Internet: <https://www.mandiant.com/resources/blog/tracking-malware-import-hashing>.

(Continued)

*Primary Examiner* — Christopher C Harris
(74) *Attorney, Agent, or Firm* — Gilliam IP PLLC (57) ABSTRACT

A system has been created that represents a binary file with a combination of signatures that account for both structure as expressed by control flow and an abstraction of functionality as expressed by import behavior. The system analyses intra-subroutine control flow and calls to import code units. The system generates structure signatures for the subroutines based on the intra-subroutine control flows. The system also generates an import behavior signature based on calls to import code units and caller-callee relationships between the subroutines and the import code units. The system uses the structure signatures to identify the caller subroutines in generating the import behavior signature. The combination of structure signatures and import behavior signature allows for accurate determination of code similarity without the noise of superficial variations in code organization and other mutations or alterations that facilitate avoiding malware detection.

22 Claims, 9 Drawing Sheets

(56) References Cited

U.S. PATENT DOCUMENTS

| | | | |
|---|---|---|---|
| 2021/0349723 A1* | 11/2021 | Hu | G06F 8/53 |
| 2022/0147629 A1* | 5/2022 | Vasilenko | G06F 21/566 |
| 2022/0164444 A1* | 5/2022 | Prudkovskij | G06F 21/577 |
| 2023/0281308 A1* | 9/2023 | Maimon | G06F 21/563 |
| | | | 726/25 |

OTHER PUBLICATIONS

Balles, "Breaking Imphash", Balles, Chris and Ateeq Sharfuddin. "Breaking Imphash." ArXiv abs/1909.07630 (2019): 5 pages.

Bourquin, et al., "BinSlayer: Accurate Comparison of Binary Executables", In: PPREW '13. Proceedings of the 2nd ACM SIGPLAN Program Protection and Reverse Engineering Workshop. ACM, New York ISBN 978-1-4503-1857-0, 10 pages.

Li, et al., "Experimental Study of Fuzzy Hashing in Malware Clustering Analysis", 8th Workshop on Cyber Security Experimentation and Test (CSET 15), Washington, D.C., Aug. 2015, 8 pages.

Li, et al., "Topology-Aware Hashing for Effective Control Flow Graph Similarity Analysis", International Conference on Security and Privacy in Communication Systems, Oct. 23, 2019, 20 pages.

\* cited by examiner

COMBINED STRUCTURE AND IMPORT BEHAVIOR SIGNATURES BASED MALWARE LEARNING AND DETECTION

BACKGROUND

The disclosure generally relates to CPC class G06F and subclass 21/50 and/or 21/56.

The Import Hash (Imphash) algorithm is a signature based scheme for detecting malicious portable executable (PE) files. Imphash generates a hash over concatenated strings created from imported function names. Imphash resolves information in an import table of a PE file to names of the dynamic link libraries (DLLs) and functions. Imphash converts the names into strings and lists the strings according to call order. Imphash then calculates a hash over the list of strings. Resolving the import table information into the names involves mapping ordinals to DLL and function names, which is done manually. Imphash also requires lowercase conversion of names and removal of file extensions.

BRIEF DESCRIPTION OF THE DRAWINGS

Embodiments of the disclosure may be better understood by referencing the accompanying drawings.

DESCRIPTION

The description that follows includes example systems, methods, techniques, and program flows to aid in understanding the disclosure and not to limit claim scope. Well-known instruction instances, protocols, structures, and techniques have not been shown in detail for conciseness.

Terminology

The description uses the term "subroutine." The term subroutine is used to refer to an identifiable sequence of instructions/code within a program. Depending on programming paradigm, programming language, and/or platform, a subroutine may be a named procedure, method, function, etc. Subroutine is used instead of these other terms since each of the other terms can have a limited meaning. For instance, the formal definition of a function specifies that a value is returned.

The description also uses the term "code unit." The term code unit is broader than subroutine since a code unit can be a fragment or single instruction but is used in this description specifically in the context of "import code units." An import code unit is imported into a program by calls within the program. An import code unit may be a dynamically linked library, an application programming interface (API) function, a subroutine defined in a library file(s), etc.

Use of the phrase "at least one of" preceding a list with the conjunction "and" should not be treated as an exclusive list and should not be construed as a list of categories with one item from each category, unless specifically stated otherwise. A clause that recites "at least one of A, B, and C" can be infringed with only one of the listed items, multiple of the listed items, and one or more of the items in the list and another item not listed.

Overview

Determining accurate ground truth verdicts for binary files can be challenging due to typically heavy reliance on third-party software and varying verdicts across different implementations. Moreover, computational limitations for analysis of binary files using tools such as disassemblers leave some malicious verdicts by the wayside. It is useful to have a notion of similarity between binary files that allows for clustering. Resulting clusters can be associated with certain binary file representations that have a high confidence of malicious/benign verdicts, allowing for extrapolation of those malicious/benign verdicts to remaining binary files in the cluster.

An executable/binary file analysis system for malware detection has been created that represents a binary file with a combination of signatures that account for both structure as expressed by control flow and an abstraction of functionality as expressed by import behavior. The system analyses disassembled code of a binary file to determine control flow within each subroutine ("intra-subroutine control flow") and calls to import code units. The system generates structure signatures for the subroutines based on the intra-subroutine control flows. The system also generates an import behavior signature based on calls to import code units and caller-callee relationships between the subroutines and the import code units. The system uses the structure signatures to identify the caller subroutines in generating the import behavior signature. The combination of structure signatures and import behavior signature allows for accurate determination of code similarity without the noise of superficial variations in code organization and other mutations or alterations that facilitate avoiding malware detection. If the system is learning clusters of signatures for benign software and malware, the system creates a fuzzy hash of each combination of signatures of sample binary files and uses clustering to yield malicious and benign clusters for malware detection. For file analysis to detect malware, the system searches for signature matches and/or determines cluster assignment.

Example Illustrations

Figure 1:
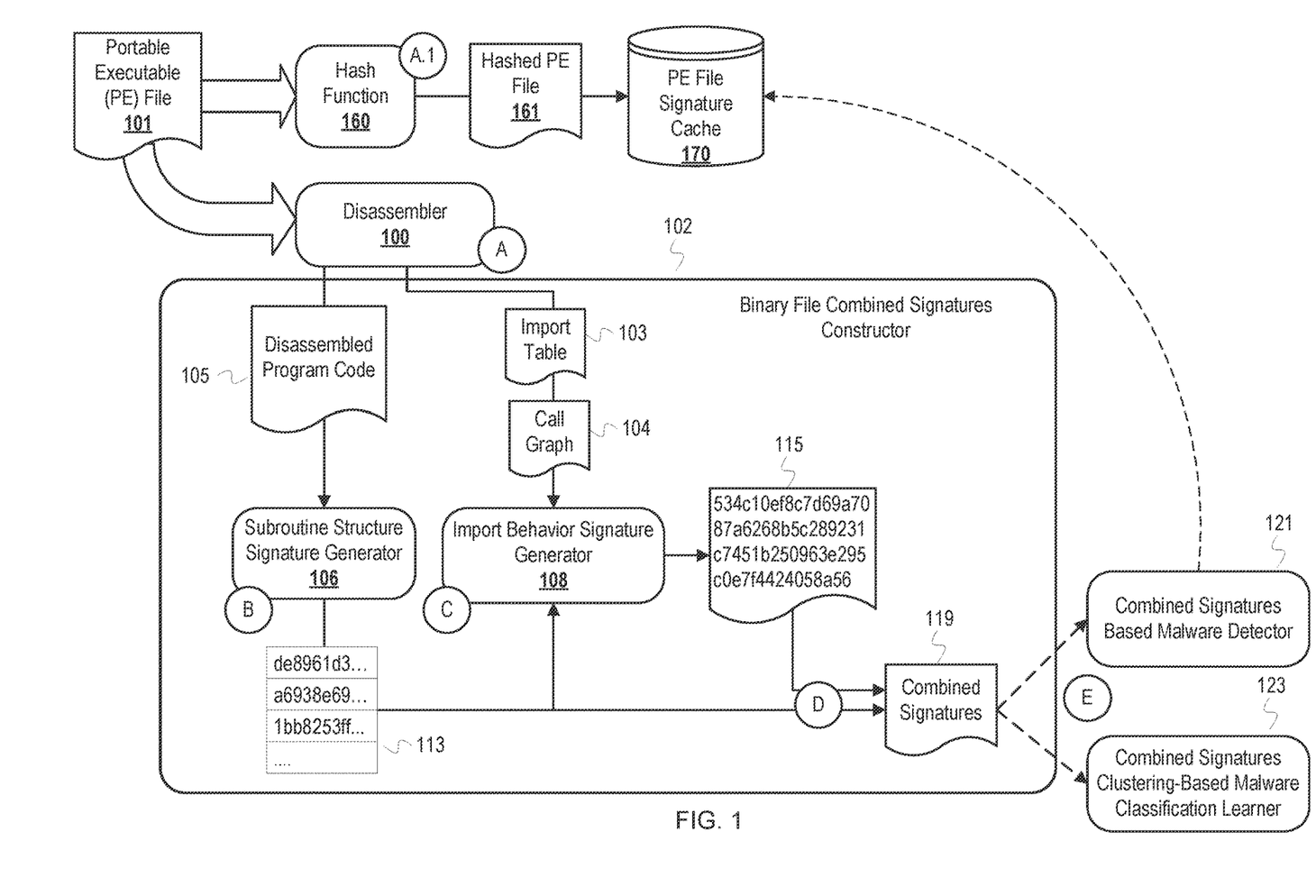
FIG. 1 is a schematic diagram of a binary file analyzer that constructs combined signatures to express structure and import behavior of a binary file and performs file analysis with the combined signatures.

FIG. 1 is a schematic diagram of a binary file analyzer that constructs combined signatures to express structure and import behavior of a binary file and performs file analysis with the combined signatures. The binary file analyzer receives output of a disassembler 100. Implementations can include a disassembler as part of the binary file analyzer. The binary file analyzer includes a binary file combined signatures constructor 102. The binary file analyzer also includes at least one of a combined signatures malware detector 121 and a combined signatures clustering-based malware classification learner 123. Combined signatures of binary files are either output to the malware detector 121 for malware detection or to the learner 123 for cluster creation and refinement.

FIG. 1 is annotated with a series of letters A-E. Each stage represents one or more operations. Although these stages are ordered for this example, the stages illustrate one example to aid in understanding this disclosure and should not be used to limit the claims. Subject matter falling within the scope of the claims can vary from what is illustrated.

At stage A, the disassembler 100 disassembles a portable executable (PE) file 101. A PE file is one example of an executable file. In this illustration, the disassembler 100 outputs disassembled program code 105, an import table 103, and a call graph 104. The call graph 104 indicates inter-subroutine control flow and calls to import functions. A subroutine structure signature generator 106 receives the disassembled program code 105 and an import behavior signature generator 108 receives the import table 103 and the call graph 104.

At stage B, the subroutine structure signature generator 106 analyzes the disassembled program code 105 to generate a vector 113 of subroutine structure signatures. The subroutine structure signature generator 106 analyzes the disassembled program code 105 to determine intra-subroutine control flow information, assuming the disassembler 100 did not provide this information. The subroutine structure signature generator 106 iterates over each basic block of each subroutine according to the intra-subroutine control flow information to create a basic block descriptor. For each basic block, the subroutine structure signature generator 106 determines a normalized basic block identifier, a basic block size, and a type of jump instruction that ends or exits the basic block. The subroutine structure signature generator 106 generates a structure signature for each subroutine with a hash of a concatenation of the basic block descriptors. The subroutine structure signature generator 106 then aggregates the subroutine structure signatures into the vector 113 to represent the structure of the PE file 101. An example of stage B is now described with reference to FIG. 2.

Figure 2:
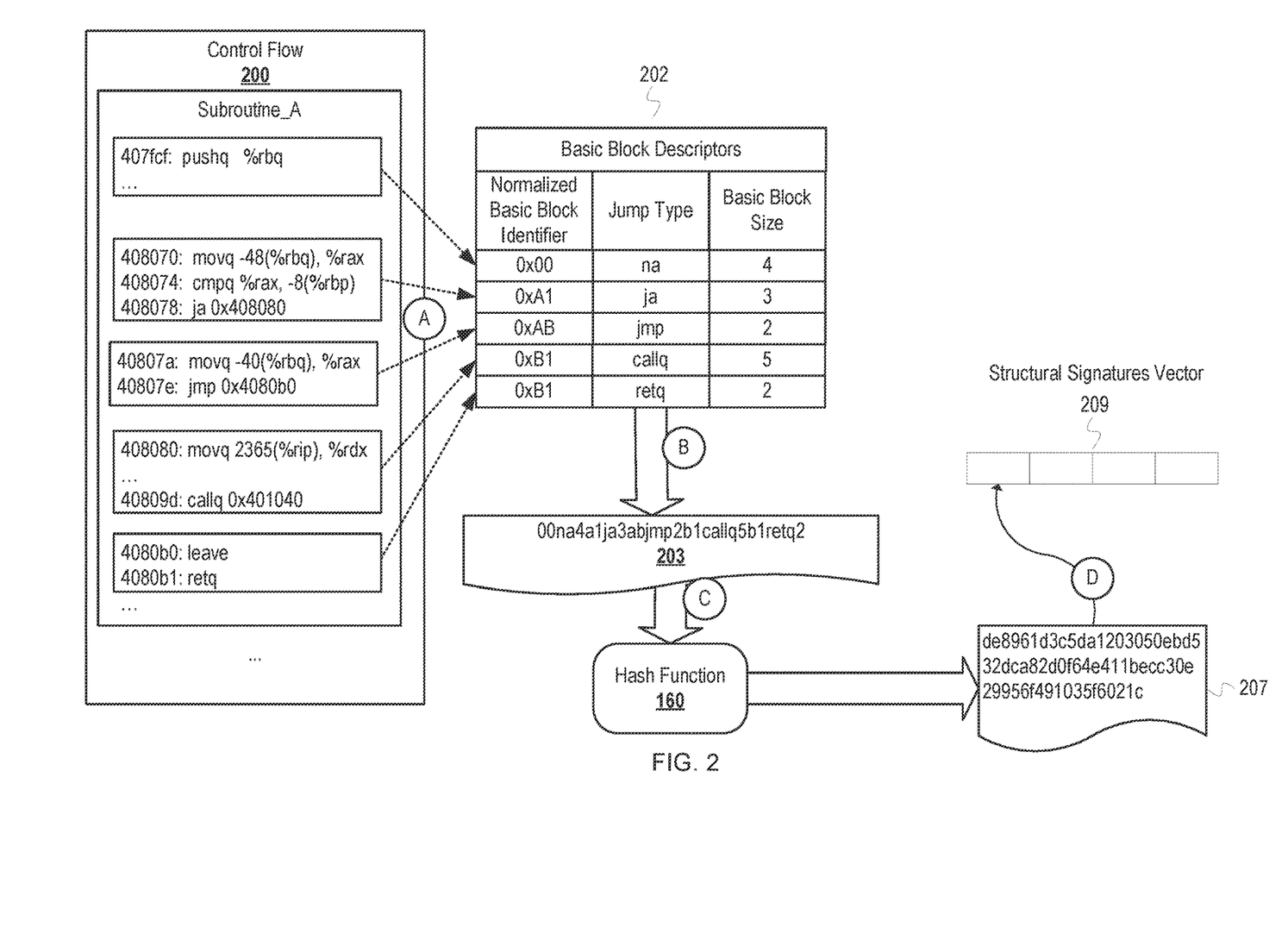
FIG. 2 is a conceptual diagram of example subroutine structure signature generation.

FIG. 2 is a conceptual diagram of example subroutine structure signature generation. From a disassembled executable program, control flows for each subroutine are obtained. The disassembler can provide the subroutine control flows or another tool depending on capability of the disassembler. FIG. 2 depicts a control flow 200 for a subroutine A. The subroutine structure signature generator 106 processes the control flow 200 to generate basic block descriptors. As the subroutine structure signature generator 106 iterates over the basic blocks of the control flow 200, the subroutine structure signature generator 106 stores the descriptors into a data structure 202. In this illustration, a basic block descriptor consists of a normalized basic block identifier, a jump type that ends the basic block, and a basic block size. Using a normalized basic block identifier instead of a memory address of the basic block allows structure to be captured without the memory address details which would yield an underfit or overly narrow descriptor. Implementations can normalize differently. For instance, an implementation may use an incrementing counter as each basic block is encountered in a subroutine. FIG. 2 illustrates a relative offset as a normalized basic block identifier. The subroutine structure signature generator 106 computes as a block identifier the offset of the basic block from the beginning of the subroutine. For size, the subroutine structure signature generator 106 counts the instructions that form a basic block. For simplicity, the example basic block descriptors in the data structure 202 do not include connection information that expresses the control flow between basic blocks. The illustration of FIG. 2 presumes that basic block descriptors are ordered according to control flow, although this may not sufficiently capture conditional jumps. Including connection information indicating multiple fields for successor basic blocks can account for conditional jumps and increases accuracy of the structure representation. Embodiments can include this control flow information in fields that indicate a target successor basic block and an adjacent basic block. For example, a first field can indicate a target basic block with the normalized basic block identifier of the target basic block and the second field can indicate the normalized identifier of the next or adjacent basic block. As with FIG. 1, FIG. 2 is annotated with letters A-D representing stages of operations.

At stage A, subroutine structure signature generator 106 generates the basic block descriptors for each basic block of Subroutine_A or updates entries in the data structure 202 corresponding to descriptor components (i.e., updates an entry with the identifier, then the jump type, and then the block size) which together form a descriptor. The basic block identifiers are indicated in the data structure 202 in hexadecimal notation for consistency with the example disassembly code. For the basic block 0x00, the jump type is indicated as "na" because the basic block flows into the adjacent basic block.

At stage B, after the basic block descriptors are generated, the subroutine structure signature generator 106 forms a subroutine structure representation 203 (e.g., a string) with the descriptors. For example, the subroutine structure signature generator 106 begins the string with the label or identifier of the subroutine "Subroutine_A" and concatenates each basic block descriptor from the data structure 202.

At stage C, the concatenation of descriptors is input into the hash function 160 to generate a subroutine structure signature 207 for the subroutine Subroutine_A. The subroutine structure signature generator 106 inserts the subroutine structure signature 207 into a vector 209 at stage D. This will be done for each subroutine until the vector 209 is fully populated and is the structure signatures vector for the disassembled program code, for example the vector 113 of FIG. 1. The signature 207 is inserted into the first entry of the vector 209 assuming Subroutine_A is the first subroutine processed. The signatures populating the vector 209 may be re-ordered or otherwise modified according to the implementation for deterministic ordering of subroutine structure signatures.

Returning to FIG. 1, at stage C, the import behavior signature generator 108 generates an import behavior signature 115 based on the import table 103, the call graph 104, and the signatures vector 113. The import behavior signature generator 108 determines identifiers of import functions or import code units from the import table 103. The import behavior signature generator 108 determines caller-callee relationships between subroutines of the disassembled program code 105 and the import code units indicated in the import table. Based on the caller-callee relationships, the import behavior signature generator 108 associates each import code unit with the subroutine structure signature indicated in the signatures vector 113 of each caller subroutine. The import behavior signature generator 108 also determines quantity of calls or call sites within each caller subroutine for each import code unit. The import behavior signature generator 108 can maintain this information of import code unit identifiers associated with caller subroutine structure signatures and call sites in a data structure ("import behavior representation structure") which represents the import behavior of the PE file 101. The import behavior signature generator 108 processes the content of the import behavior representation structure for hashing (e.g., converts to a string form by converting the contents into strings and concatenating the strings) and hashes the processed content to generate the import behavior signature 115. An example of stage C is now described with reference to FIG. 3.

Figure 3:
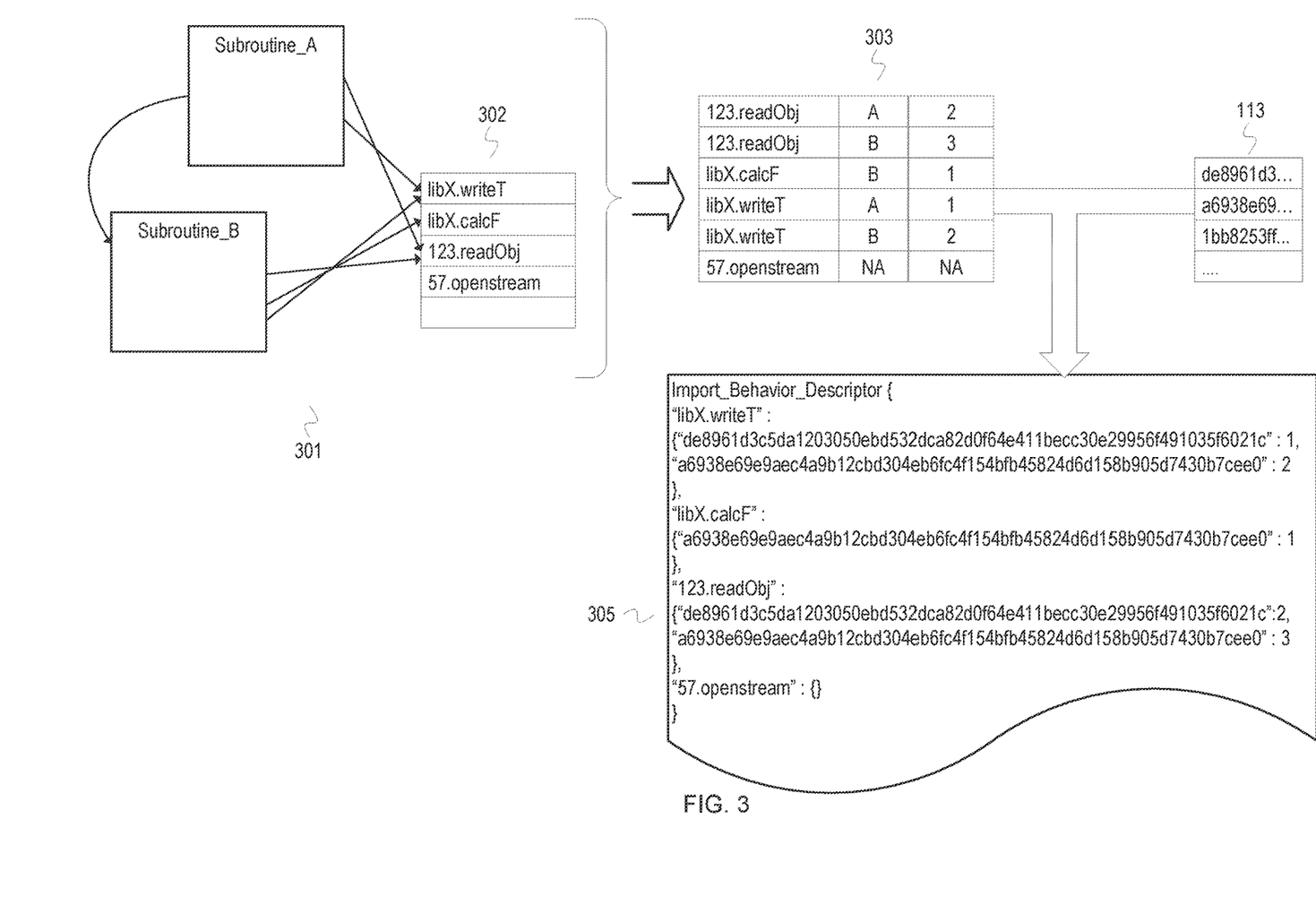
FIG. 3 is a conceptual diagram of example import behavior signature generation.

FIG. 3 is a conceptual diagram of example import behavior signature generation. As with the subroutine control flows, disassembly of an executable program yields a listing of import code units, or an import table, and a call graph. FIG. 3 depicts an import table 302 and a call graph 301. With the call graph 301 and the import table 302, the import behavior signature generator 108 determines caller-callee relationships between the subroutines and the import code units. Based on the relationships, the import behavior signature generator 108 creates an import call table 303. The import call table 303 in this illustration includes an entry for each relationship (i.e., import code unit and a caller subroutine) along with call site quantity in the caller subroutine. The import behavior signature generator 108 uses the import call table 103 and the subroutine structure signatures vector 113 to create an import behavior descriptor 305. The import behavior signature generator 108 can maintain a separate data structure (not illustrated) that preserves associations between subroutine identifiers and subroutine structure signatures (e.g., a table of subroutine identifiers and indexes into the structure signatures vector). In this illustration, the import behavior descriptor 305 is a data structure or object that indicates each import code unit in association with the structure signature of each caller subroutine and call site quantity. To generate the import behavior signature, the import behavior signature generator 108 transforms the content into a form that can be input into a hash function. For instance, the import behavior signature generator 108 extracts the strings that constitute the import behavior descriptor and hashes a concatenation of the extracted strings.

Returning to FIG. 1, at stage D, the binary file combined signatures constructor 102 combines the structure signature 113 and the import behavior signature 115 into a combined signatures 119 which represents the structure and import behavior of the PE file 101. Combining the signatures can be implemented differently. The signatures can be associated with populating a data structure with the different signatures. A data structure can be created that includes references (e.g., pointers or memory addresses) to the signatures vector 113 and the import behavior signature 115. As another example implementation, either the signature vector 113 or the import behavior signature 115 can be written into a data structure that includes a reference to the other.

At stage E, the binary file combined signatures constructor 102 outputs the combined signatures 119 to either the malware detector 121 or the learner 123 depending upon context. If the binary file analyzer is learning malware characteristics based on combined signatures, then the combined signatures 119 is one of multiple output to the learner 123 and the PE file 101 is one of multiple sample binary files. An example conceptual diagram depicts this clustering in FIG. 7, and example operations for the learner 123 are described later with reference to FIG. 8. If the binary file analyzer is analyzing the PE file 101 for malware detection, then the combined signatures 119 is output to the malware detector 121. The malware detector 121 searches for a match of a fuzzy hash of the combined signatures 119 and/or determine a cluster assignment for a fuzzy hash of the combined signatures 119 to obtain a malware verdict.

In some cases, the binary file analyzer searches for a match of a signature of the PE file 101 before constructing the combined signatures 119. After the PE file 101 is obtained/received, the binary file analyzer can generate a hashed PE file 161 with a hash function 160 at stage A.1. The binary file analyzer then searches a cache 170 of PE file signatures. Each entry in the cache 170 is associated with an indication of a malware verdict determined in advance from ground truth or the cluster-based learning. Determining a verdict based on the file hash leverages the previous learning and/or ground truth and conserves resources that would be consumed for the example operations of stages A-E.

While described referring to PE files, the operations in FIG. 1 can occur for any binary file type for which a disassembler (or relevant tool) can generate subroutine control flows or CFGs, a call graph, and an import table. For instance, files can be in Executable and Linkable Format (ELF), System Object Model (SOM) format, etc. Multiple instances of the file signatures cache can be maintained for each file format and, in some instances, for different malware families, malicious campaigns, etc.

Figure 4:
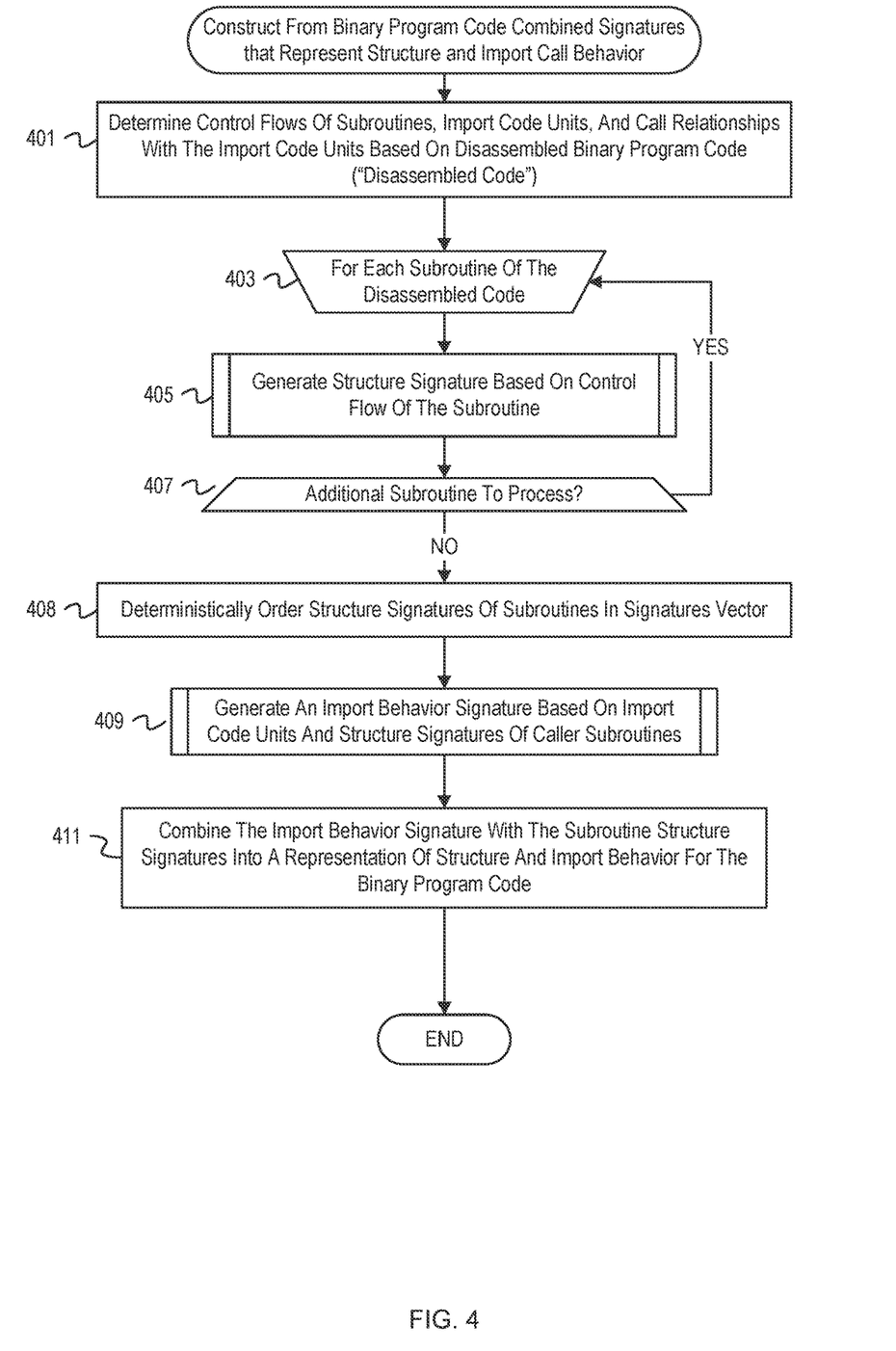
FIG. 4 is a flowchart of example operations to construct from binary program code combined signatures that represent structure and import call behavior.
Figure 5:
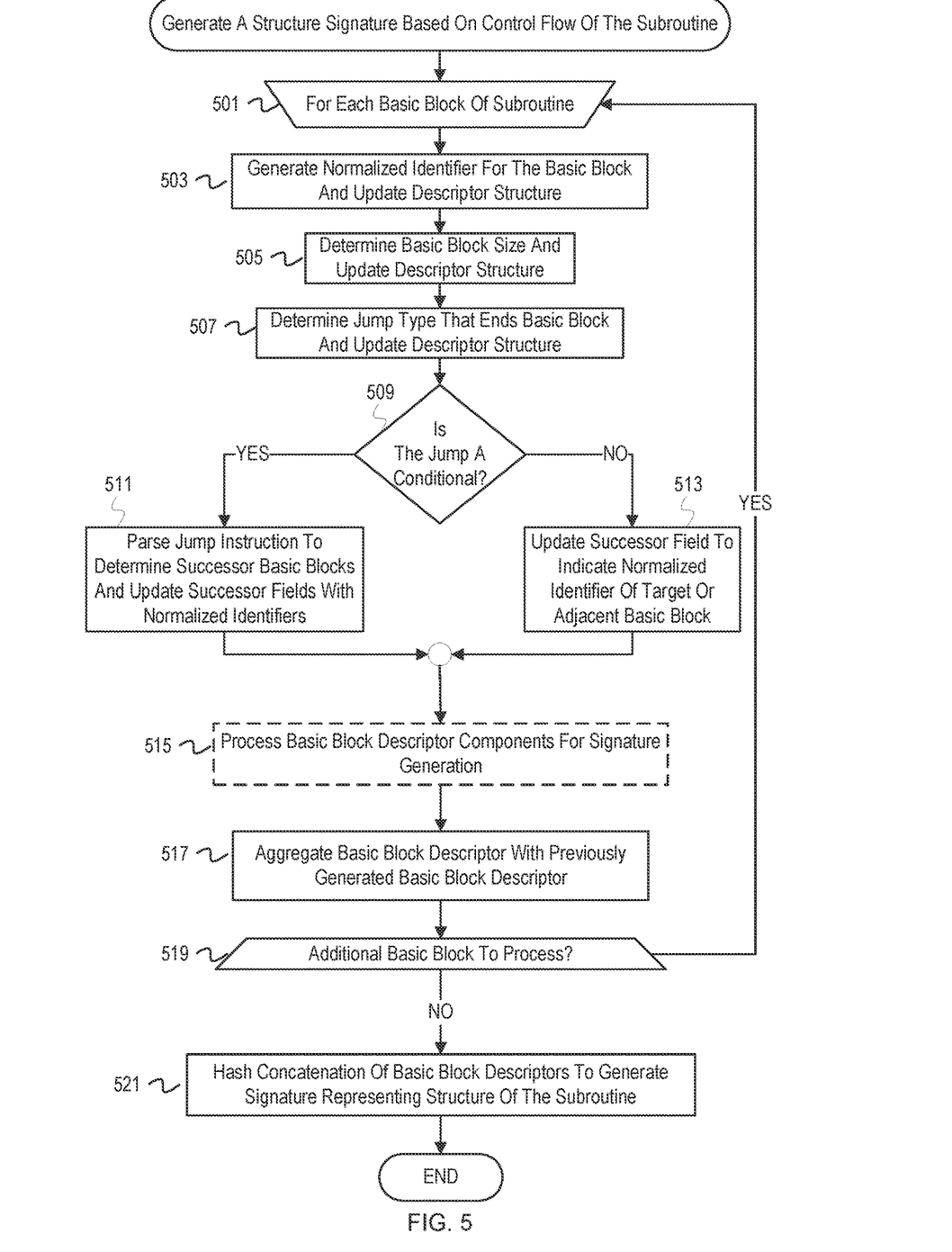
FIG. 5 is a flowchart of example operations to generate a structure signature based on control flow of a subroutine.
Figure 6:
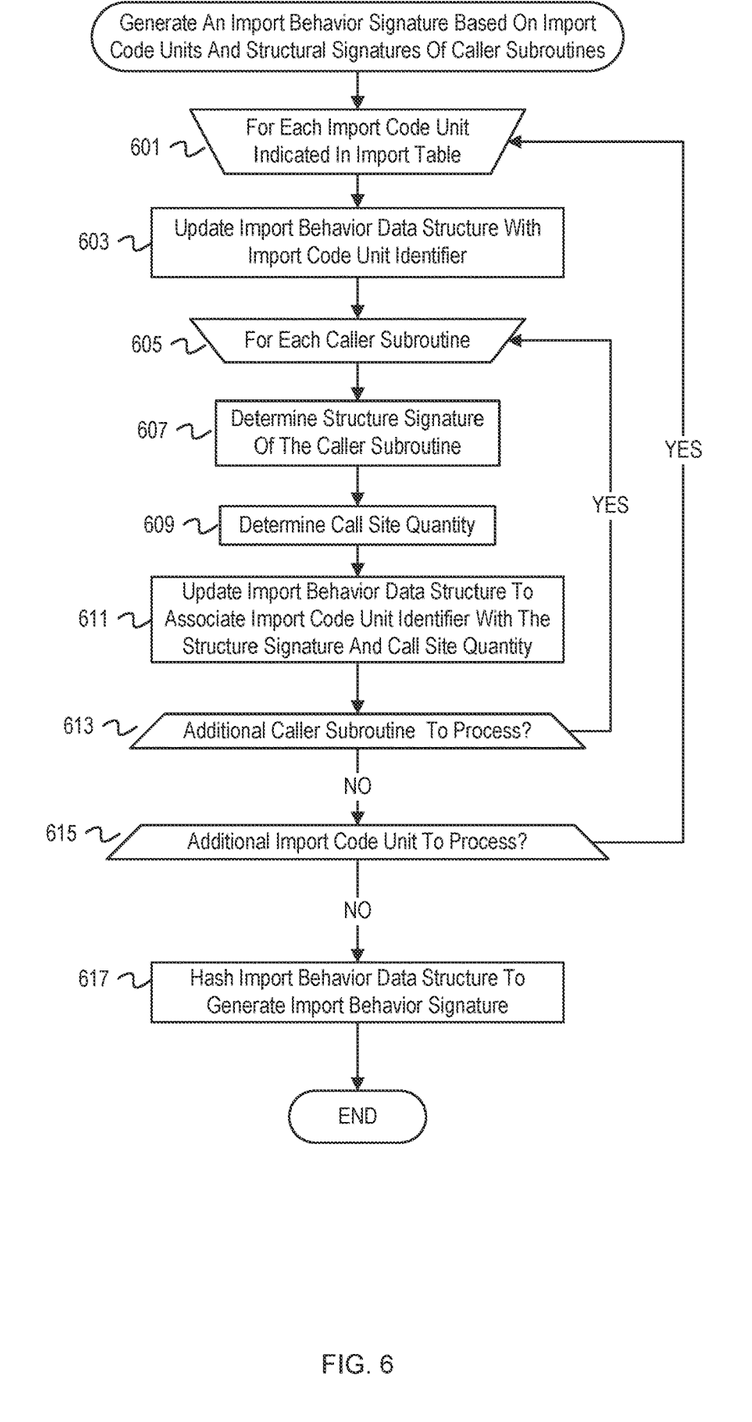
FIG. 6 is a flowchart of example operations to generate an import behavior signature based on import code units and structure signatures of caller subroutines.
Figure 7:
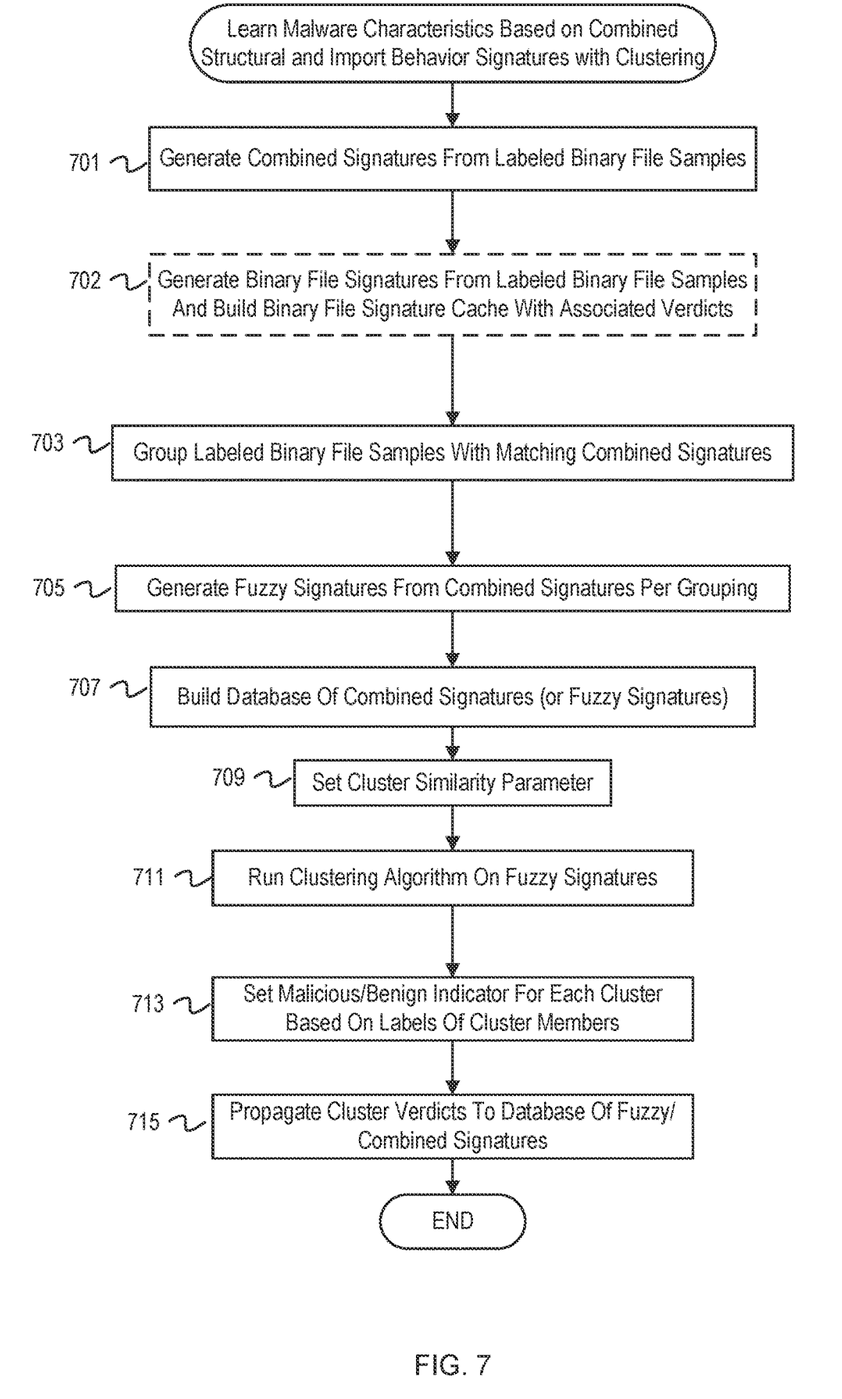
FIG. 7 is a flowchart of example operations to learn malware characteristics based on combined structure and import behavior signatures with clustering.
Figure 8:
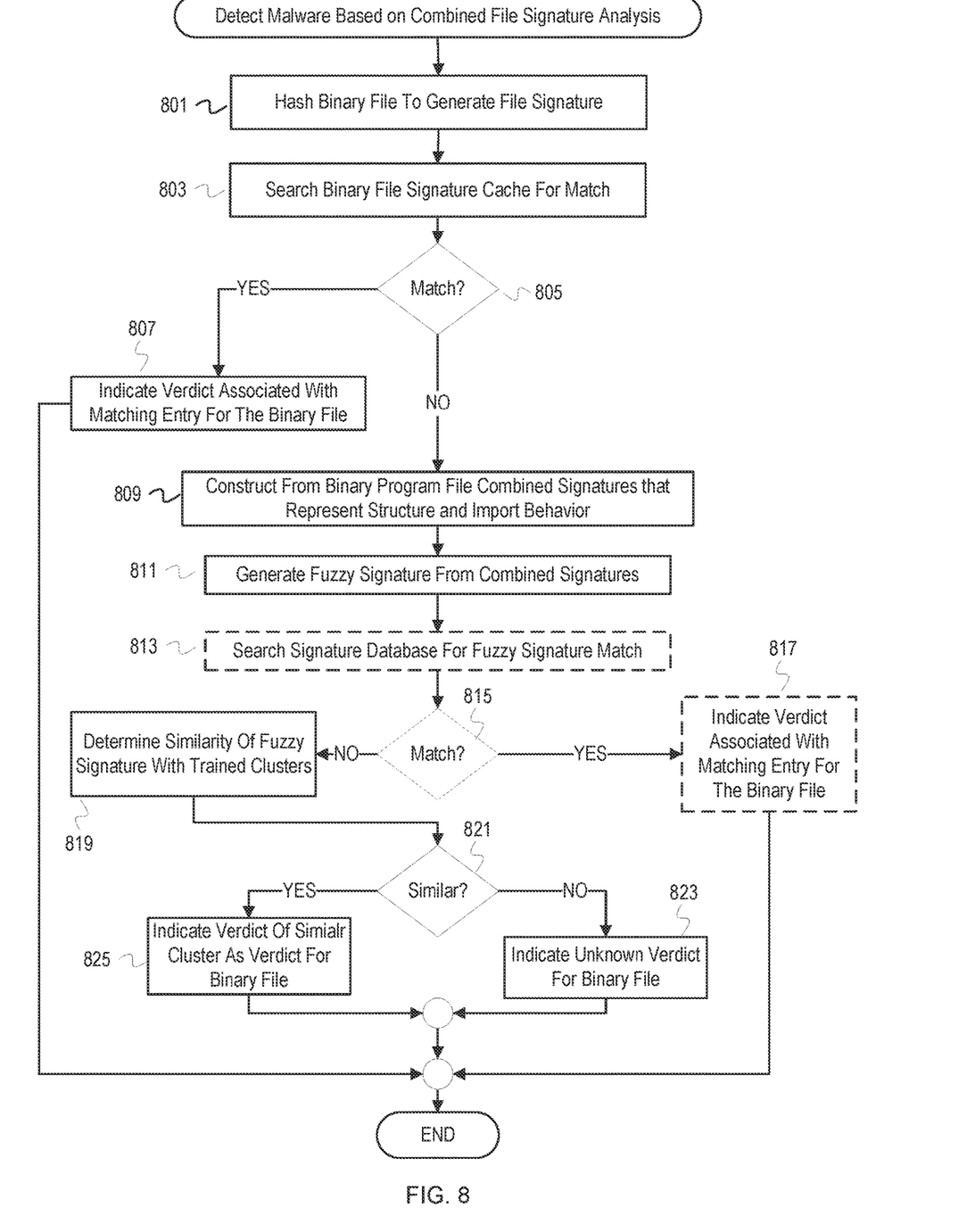
FIG. 8 is a flowchart of example operations to detect malware based on combined file signature analysis.

FIGS. 4-8 are flowcharts of example operations for various aspects of the disclosed technology. FIGS. 4-6 relate to construction of the combined structure signatures and import behavior signature to represent an executable or binary file. The description refers to a binary file analysis system as performing the example operations of FIGS. 4-6. FIGS. 7-8 are flowcharts respectively relating to learning malware characteristics as represented by combined signatures and detecting malware based on the learning.

FIG. 4 is a flowchart of example operations to construct from binary program code combined signatures that represent structure and import call behavior. FIG. 4 is described based on an assumption that disassembly code has already been generated for a binary program code.

At block 401, a binary file analysis system determines control flows of subroutines, import code units, and call relationships with the import code units based on disassembled binary program code ("disassembled code"). This information can be generated from a disassembler or tool that analyzes output of a disassembler. The caller-callee relationships between subroutines and import code units can be determined from analyzing control flows and/or the disassembled code and import table to identify call sites of the import code units identified in the import table. For this determination, analysis can involve resolving symbols to import code unit names/identifiers.

At block 403, the binary file analysis system begins processing each subroutine of the disassembled code. This iterative processing is to generate a structure signatures for each subroutine.

At block 405, the binary file analysis system generates a structure signature for the subroutine of the current processing iteration. The structure signature is generated based on the control flow of the subroutine or intra-subroutine control flow information. FIG. 5 provides more detailed example operations for generation of a subroutine structure signature.

At block 407, the binary file analysis system determines whether there is another subroutine of the disassembled code to process. If not, then control flows to block 408. If there is another subroutine to process, then operational flow returns to block 403.

At block 408, the binary file analysis system deterministically orders the structure signatures of the subroutines in the signatures vector. Implementations can deterministically order the subroutine structure signatures differently. For example, the deterministic ordering can be ascending ordering by subroutine signature value (i.e., by hash values). The deterministic ordering is intended to preserve structure of the binary file at a granularity of the subroutines while still covering binary program codes with superficial alterations and/or deviations possibly intended to avoid detection by signature matching. Regardless the specific implementation, the ordering should be consistent across signature generations. While the description refers to a vector, another appropriate data structure could be used according to platform, programming language, etc.

At block 409, the binary file analysis system generates an import behavior signature based on import code units and structure signatures of caller subroutines. Deterministic ordering is again used to ensure reliability of matching. Before generating the signature, the binary file analysis system deterministically orders the import code units (e.g., by label/name) and orders the caller signatures by value (e.g., by ascending hash value). While structure of the binary program code is represented by the subroutine structure signatures, some functionality of the binary program code can be expressed with import behavior. The import behavior signature represents the import behavior of the binary program code. FIG. 6 provides example operations for generation of an import behavior signature.

At block 411, the binary file analysis system combines the import behavior signature with the subroutine structure signatures into a representation of structure and import behavior for the binary program code. For example, a data structure is populated with the signatures vector and the import behavior signature. As another example, the import behavior signature is written into a data structure that includes a reference/pointer to the subroutine structure signatures vector.

FIG. 5 is a flowchart of example operations to generate a structure signature based on control flow of a subroutine. The description of FIG. 5 presumes that control flow for a subroutine has been obtained, or a handle or location of the control flow has been provided. The operations of FIG. 5 are repeated for each subroutine of disassembled program code. A data structure ("descriptor structure") with a field for each structure component can be instantiated and updated with information for each subroutine or a descriptor structure can be instantiated for the binary program and each entry have a field for each component which is updated with information for the represented subroutine.

At block 501, the binary file analysis system begins analyzing each basic block of a subroutine according to control flow. Control flow is likely represented with a hierarchical structure that includes or refers to basic blocks of the subroutine. The binary file analysis system traverses the hierarchical structure to capture control flow and generate the descriptors.

At block 503, the binary file analysis system generates a normalized identifier for the basic block and updates the descriptor structure. The normalized identifier can be an offset relative to a beginning of the basic block. As another example, the binary file analysis system can create a normalized identifier with an ordinal for the basic block (e.g., 1, 2, 3, etc.).

At block 505, the binary file analysis system determines a basic block size and updates the descriptor structure. The binary file analysis system counts the instructions to determine size. Implementations can instead use consumed memory space (e.g., size in bytes) to indicate basic block size.

At block 507, the binary file analysis system determines a type of jump instruction that terminates the basic block (e.g., callq, jmp, ja, etc.) and updates the descriptor structure. A basic block does not necessarily terminate with a jump instruction and control may flow into the adjacent basic block. For this case, the binary file analysis system can use a flag to indicate the absence of a jump instruction, which does not conflict with or overload the jump type indicators.

At block 509, the binary file analysis system determines whether the jump instruction is a conditional jump. If the jump is a conditional jump, then operational flow proceeds to block 511. Otherwise, operational flow proceeds to block 513.

At block 511, the binary file analysis system parses the jump instruction to determine successor basic blocks and updates successor fields of the descriptor structure accordingly. If the jump instruction is a conditional jump instruction, then there are two paths for control flow: 1) a target basic block, and 2) the adjacent basic block. In the case of two paths, the binary file analysis system updates a first successor field to indicate the normalized basic block identifier of the target basic block and updates a second successor field to indicate the normalized identifier of the adjacent basic block. Operational flow continues to block 515.

At block 513, the binary file analysis system updates a successor field of the basic block descriptor to indicate a normalized identifier of a target basic block or an adjacent basic block. If the terminating instruction is a jump type instruction that is not conditional, then the binary file analysis system updates the basic block descriptor to indicate the normalized identifier of the target basic block. If the jump is a call to an import code unit or there is no terminating jump instruction, then the successor field is updated to indicate a normalized identifier of the adjacent basic block. If the call is to another subroutine instead of an import code unit, then a flag or symbol can be used in one of the successor fields to indicate control flow to another subroutine. Operational flow proceeds to block 515.

At block 515, the binary file analysis system processes the basic block descriptor components that have been determined for signature generation. Block 515 is depicted in a dashed line because it is an optional operation depending upon how the binary file analysis system is implemented. If signature generation is implemented to receive a string as input and the basic block descriptor components are not character or string data types, then the data types of the components will be converted to an appropriate type for string generation (e.g., prepared to be acceptable input for a hash function).

At block 517, the binary file analysis system aggregates the basic block descriptor with previously generated basic block descriptors. Aggregating the descriptors can be concatenating the descriptors depending on current form of the descriptor. In addition, the binary file analysis system can aggregate the descriptors after generating the descriptors. A subroutine structure signature will include the basic block descriptors with the connection information that expresses intra-subroutine control flow. With conditional jumps, the control flow is likely a hierarchical form (e.g., a tree). The accumulation of basic block descriptors can be considered a flattened tree.

At block 519, the binary file analysis system determines whether there is an additional basic block to process. If there is an additional basic block to process, then operational flow returns to block 501. If not, then operational flow proceeds to block 521.

At block 521, the binary file analysis system hashes the concatenation of basic block descriptors to generate a signature representing structure of the subroutine. Since the basic block descriptors have been prepared to be appropriate input for a hash function, the string of basic block descriptors that represents structure of the subroutine can be passed to a hash function.

FIG. 6 is a flowchart of example operations to generate an import behavior signature based on import code units and structure signatures of caller subroutines. After generating structure signatures for the subroutines, the binary file system generates an import behavior signature as a partial expression of functionality of the binary program code. The import behavior signature is generated after the subroutine structure signatures because the import behavior signature uses the structure signatures of those subroutines that call to the import code units. As previously mentioned, the description of FIG. 6 presumes that an import table and information from which caller-callee relationships can be determined (e.g., a call graph) has been provided from or after disassembly.

At block 601, the binary file system begins processing each import code unit indicated in the import table. If an import table is not available that resolves symbols from an import library to import functions, the binary file system can resolve the symbols or use a combination of library name and function symbol as a name or identifier of an import code unit.

At block 603, the binary file system updates an import behavior data structure with an import code unit identifier. The binary file system instantiates a data structure to host information that expresses import behavior which is then used to create the import behavior signature.

At block 605, the binary file system begins processing each caller subroutine. With a call graph, the binary file system can determine which of the subroutines call the import code unit. The binary file system can then iteratively determine relevant information from the basic blocks of the caller subroutines.

At block 607, the binary file system determines the structure signature of the caller subroutine. While making the structure signatures, the binary file system would maintain associations between the subroutine identifiers and the structure signatures. This would allow the binary file system to look up a corresponding structure signature.

At block 609, the binary file system determines call site quantity for the import code unit within the currently selected caller subroutine. Multiple basic blocks of a subroutine may have calls to the import code unit. The binary file system can use the call graph and/or analyze the control flow of the caller subroutine to determine the quantity of calls or number of call instructions to the import code unit.

At block 611, the binary file system updates the import behavior data structure to associate the import code unit identifier with the structure signature and the call site quantity of the caller subroutine. For example, the binary file system can update an entry of the import behavior data structure to indicate the import code unit name, the structure signature of the caller subroutine, and the determined call site quantity.

At block 613, the binary file system determines whether there is an additional caller subroutine to process. If not, then operational flow proceeds to block 615. If there is an additional subroutine to process, then operational flow returns to block 605.

At block 615, the binary file system determines if there is an additional import code unit to process. For example, the binary file system determines whether the end of the import table has been reached. If there is no additional import code unit to process, then operational flow proceeds to block, 617. Otherwise, operational flow returns to block 601.

At block 617, the binary file system hashes the import behavior data structure to generate the import behavior signature. To hash the information in the data structure, the data structure may be preprocessed. For example, the binary file system may read the data structure extract the information from each field. The data structure or object that hosts the information will likely have a definition or known schema that guides the binary file system. As an example, the binary file system may build a string that represents the import behavior based on extracting the information from the data structure/object. In some cases, the binary file system would order the import code units according to a paradigm that facilitates consistency across binary files. Similar to the subroutine structure signatures vector, the binary file system may alphabetically order the import code unit names before building the representation.

As previously stated, combined signatures are used in both learning malware characteristics and detecting malware. FIG. 7 is a flowchart of example operations to learn malware characteristics based on combined structure and import behavior signatures with clustering. With a combination of signatures to represent a binary program code/file, characteristics of the files are abstracted to an extent that preserves structure and import behavior sufficient to distinguish between malware and not malware with high accuracy while capturing a greater number of files by eschewing distracting details. Thus, characteristics of malware can be learned instead of specific implementations. This captures malware that avoids file signature matching with varying organization and formatting.

At block 701, a binary file analysis system generates combined signatures from labeled binary file samples. The binary file analysis system generates a subroutine structure signatures vector and an import behavior signature and combines them for each sample. The verdict labels of the samples are associated with respective ones of the combined signatures. A mapping can be maintained from the sample identifier and label to the combined signatures.

At block 702, the binary file analysis system generates binary file signatures from the labeled binary file samples. The binary file analysis system uses the binary file signatures to build a binary file signature cache with associated verdicts. This is an optional operation since embodiments do not necessarily build the signature cache. The signature cache operates as a short circuit or fast route for signature matching which leverages the ground truth represented by the labels. If the exact same file is encountered as one of the ground truth samples, then the binary file signature will match and the associated verdict can be used.

At block 703, the binary file analysis system groups the labeled binary file samples with matching combined signatures. To filter out redundant combined signatures, the binary file analysis system determines which combined signatures are duplicates. The binary file analysis system can then map or associate the binary file samples to a single representative combined signatures. This also reduces the input to the clustering algorithm.

At block 705, the binary file analysis system generates fuzzy signatures from the combined signatures per group. With the grouping, the binary file analysis system iterates over the combined signatures to generate a fuzzy hash signature for each of the combined signatures. The fuzzy hashing transforms the subroutine structure signatures and the import behavior signature into a space where the combined signatures can be compared with each other for similarity. Examples of fuzzy hashing algorithms that can be used include ssdeep, TLSH, etc. Multiple fuzzy hashing algorithms can be applied to the combined signatures and the results can be concatenated to generate a final signature.

At block 707, the binary file analysis system builds a database of combined signatures or a database of the fuzzy signatures. The database is later used in detection for signature matching with the combined signatures or fuzzy signatures associated with verdicts learned from the clustering.

At block 709, the binary file analysis system sets cluster parameters. Clustering parameters will depend on the utilized clustering algorithm. Example parameters include maximum cluster size, sample size, distance threshold, etc.

At block 711, the binary file analysis system runs a clustering algorithm on the fuzzy signatures. Examples of a clustering algorithm that could be used include k-means, k-medians, Density-Based Spatial Clustering of Applications with Noise (DBSCAN), and Expectation-Maximization (EM) Clustering using Gaussian Mixture Models (GMM). To illustrate, the clusters can be represented as a disjoint-set data structure and clustering can occur using agglomerative hierarchical clustering with Levenshtein distance between fuzzy signatures, wherein the cluster are cut out from a depth of the hierarchical clustering that can be tuned. As more specific examples, an implementation can use the ssdeep library which provides functions for hash generation, comparison, and clustering. As another example, an implementation can use the TLSH library for the hash generation and clustering.

At block 713, the binary file analysis system sets malicious/benign indicators for each cluster based on the labels of the cluster members. Verdict assignment for a cluster can be determined with a voting technique, such as majority voting or weighted voting. Embodiments can use curated rules. A cluster is not associated with a benign verdict unless all members are associated with benign verdicts. Embodiments are not limited to a single clustering algorithm. Instead, multiple clustering algorithms can be run on the fuzzy signatures (block 711) and a consensus function can be used to determine the verdicts to associate with the clusters based on results of the ensemble of clusters.

At block 715, the binary file analysis system propagates the verdicts of the clusters to the database of signatures. Database entries for those fuzzy signatures or combined signatures that are members of a benign cluster will be associated with an indicator of a benign verdict. Likewise, database entries for those fuzzy signatures or combined signatures that are members of a malicious cluster will be associated with an indicator of malware or a malicious verdict. Embodiments may use a third classification of unknown or use the unknown classification instead of benign.

FIG. 8 is a flowchart of example operations to detect malware based on combined file signature analysis. In FIG. 8, example operations considered as optional are depicted in dashed lines. The optional example operations (813, 815, 817) correspond to the use of fuzzy or combined signatures matching for malware detection.

At block 801, the binary file analysis system hashes a binary file to generate a binary file signature. Before or concurrent with disassembly, the binary file analysis system transforms the binary file into a hash input and hashes the input to generate the binary file signature.

At block 803, the binary file analysis system searches the binary file signature cache for a match with the generated binary file hash. As described, the cache is populated with file signatures of binary files with known malware verdicts.

At block 805, the binary file analysis system determines whether a match was found in the file signature cache. If the search returns indication of a match, then operational flow proceeds to block 807. Otherwise, operational flow proceeds to block 809.

At block 807, the binary file analysis system indicates the malware verdict associated with the matching entry for the binary file. Since a match has been found, the verdict is known and no further analysis is performed and the resources to construct the structure and import behavior signatures can be conserved.

At block 809, the binary file analysis system constructs from the binary program file a combined signatures that represent structure and import behavior of the binary program code in the file. As previously described, the binary file analysis system processes the disassembly code generated from disassembling the binary program code.

At block 811, the binary file analysis system generates a fuzzy signature from the combined signatures. The same fuzzy hashing function used when clustering would be used.

At block 813, the binary file analysis system searches a signature database for a match with the fuzzy signature. Match with a fuzzy signature in the database allows the previously determined cluster verdict to be used. Embodiments can maintain a database of the combined subroutine structure signatures and import behavior signature for matching instead of a database of fuzzy signatures.

At block 815, the binary file analysis system determines whether searching the signatures database yields a match. If a match is found, then operational flow proceeds to block 817. Otherwise, operational flow proceeds to block 819.

At block 817, the binary file analysis system indicates the verdict associated with the matching entry for the binary file.

At block 819, the binary file analysis system determines similarity of the fuzzy signature that represents the binary file with any one of the trained clusters. The binary file analysis system invokes a function of the library that was used for the cluster-based learning to determine similarity.

At block 821, the binary file analysis system determines whether the fuzzy signature was similar to one of the trained clusters. The fuzzy signature may be an outlier and outside of the distance threshold to be deemed similar to any of the trained clusters. If similar, then operational flow proceeds to block 825. If not, then operational flow proceeds to block 823.

At block 823, the binary file analysis system indicates an unknown verdict for the binary file. Since the fuzzy signature representing the binary file was not similar to any one of the trained clusters, a benign or malicious verdict could not be obtained.

At block 825, the binary file analysis system indicates the verdict of the similar cluster as the verdict for the binary file represented by the fuzzy signature. In some implementations, the verdict of the trained cluster can also be "unknown," likely due to a heterogenous membership without any majority.

The flowcharts are provided to aid in understanding the illustrations and are not to be used to limit scope of the claims. The flowcharts depict example operations that can vary within the scope of the claims. Additional operations may be performed; fewer operations may be performed; the operations may be performed in parallel; and the operations may be performed in a different order. It will be understood that each block of the flowchart illustrations and/or block diagrams, and combinations of blocks in the flowchart illustrations and/or block diagrams, can be implemented by program code. The program code may be provided to a processor of a general-purpose computer, special purpose computer, or other programmable machine or apparatus.

As will be appreciated, aspects of the disclosure may be embodied as a system, method or program code/instructions stored in one or more machine-readable media. Accordingly, aspects may take the form of hardware, software (including firmware, resident software, micro-code, etc.), or a combination of software and hardware aspects that may all generally be referred to herein as a "circuit," "module" or "system." The functionality presented as individual modules/units in the example illustrations can be organized differently in accordance with any one of platform (operating system and/or hardware), application ecosystem, interfaces, programmer preferences, programming language, administrator preferences, etc.

Any combination of one or more machine-readable medium(s) may be utilized. The machine-readable medium may be a machine-readable signal medium or a machine-readable storage medium. A machine-readable storage medium may be, for example, but not limited to, a system, apparatus, or device, that employs any one of or combination of electronic, magnetic, optical, electromagnetic, infrared, or semiconductor technology to store program code. More specific examples (a non-exhaustive list) of the machine-readable storage medium would include the following: a portable computer diskette, a hard disk, a random-access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a machine-readable storage medium may be any tangible medium that can contain or store a program for use by or in connection with an instruction execution system, apparatus, or device. A machine-readable storage medium is not a machine-readable signal medium.

A machine-readable signal medium may include a propagated data signal with machine-readable program code embodied therein, for example, in baseband or as part of a carrier wave. Such a propagated signal may take any of a variety of forms, including, but not limited to, electromagnetic, optical, or any suitable combination thereof. A machine-readable signal medium may be any machine-readable medium that is not a machine-readable storage medium and that can communicate, propagate, or transport a program for use by or in connection with an instruction execution system, apparatus, or device.

Program code embodied on a machine-readable medium may be transmitted using any appropriate medium, including but not limited to wireless, wireline, optical fiber cable, RF, etc., or any suitable combination of the foregoing.

The program code/instructions may also be stored in a machine-readable medium that can direct a machine to function in a particular manner, such that the instructions stored in the machine-readable medium produce an article of manufacture including instructions which implement the function/act specified in the flowchart and/or block diagram block or blocks.

Figure 9:
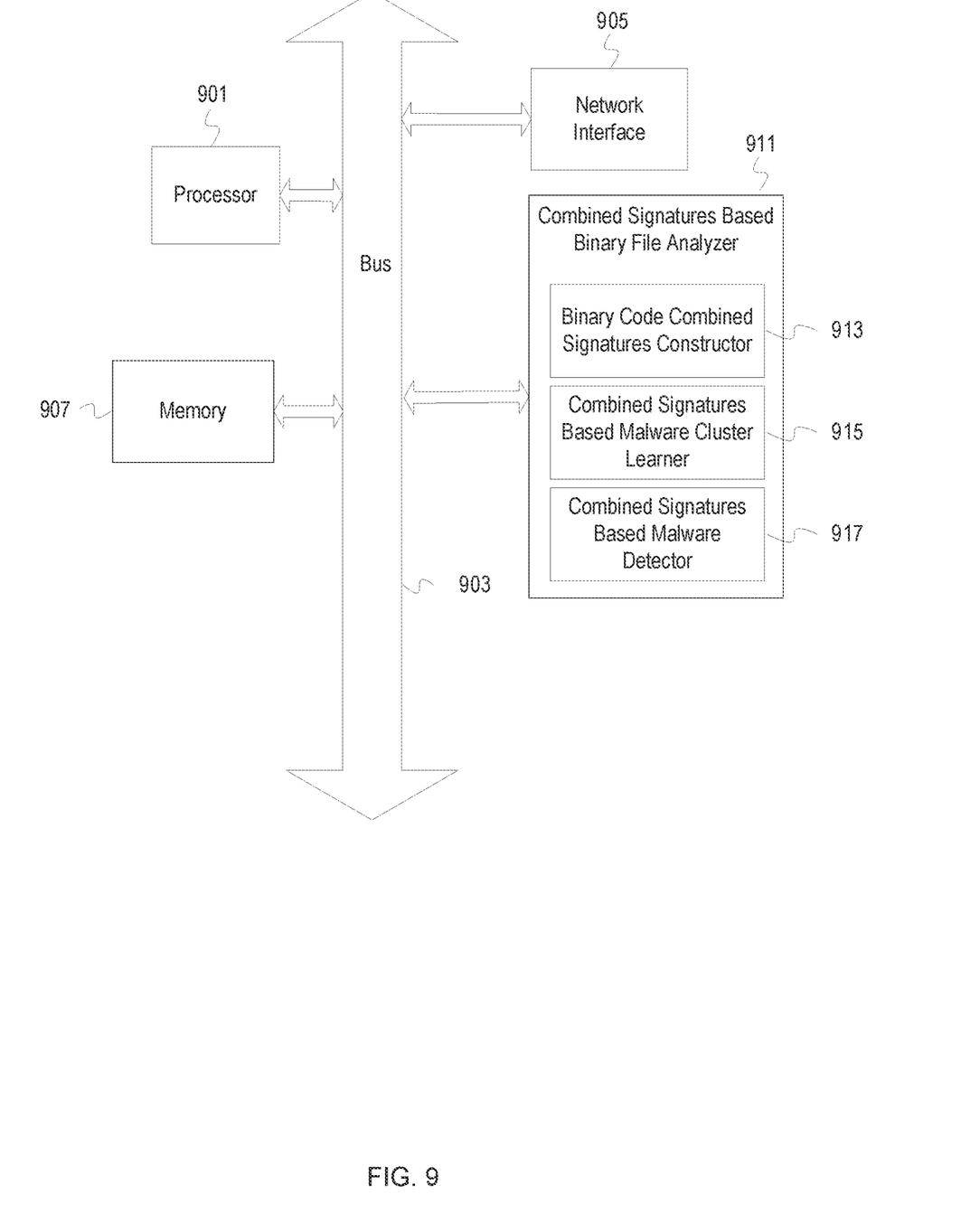
FIG. 9 depicts an example computer system with a combined signatures based binary file analyzer.

FIG. 9 depicts an example computer system with a combined signatures based binary file analyzer. The computer system includes a processor 901 (possibly including multiple processors, multiple cores, multiple nodes, and/or implementing multi-threading, etc.). The computer system includes memory 907. The memory 907 may be system memory or any one or more of the above already described possible realizations of machine-readable media. The computer system also includes a bus 903 and a network interface 905. The system also includes a combined signatures based binary file analyzer 911. The combined signatures based binary file analyzer 911 constructs a combination of signatures that represent subroutines structures of a binary file and import behavior of the binary file, thus capturing structure and some functionality. The combined signatures based binary file analyzer 911 uses the construction for learning and/or malware detection. The combined signatures based binary file analyzer 911 is depicted as including a binary code combined signatures constructor 913, a combined signatures based malware cluster learner 915, and a combined signatures based malware detector 917. The binary code combined signatures constructor 913 constructs a combined signatures to represent a binary file from a subroutine structure signatures vector and an import behavior signature. The binary code combined signatures constructor 913 analyzes intra-subroutine control flow information for a disassembled binary file to generate the vector of subroutine structure signatures. The binary code combined signatures constructor 913 analyzes call information from a call graph and an import table to generate the import behavior signature. The combined signatures based malware cluster learner 915 uses the constructor 913 to create combined signatures from a training dataset of binary file samples and learns malware characteristics as expressed by the fuzzy hashes of the combined signatures. The combined signatures based malware detector 917 uses the constructor 913 to construct combined signatures and information from the cluster learner 915 to detect malware. The combined signatures based binary file analyzer 911 can include one or both of the learner 915 and detector 917. Any one of the previously described functionalities may be partially (or entirely) implemented in hardware and/or on the processor 901. For example, the functionality may be implemented with an application specific integrated circuit, in logic implemented in the processor 901, in a co-processor on a peripheral device or card, etc. Further, realizations may include fewer or additional components not illustrated in FIG. 9 (e.g., video cards, audio cards, additional network interfaces, peripheral devices, etc.). The processor 901 and the network interface 905 are coupled to the bus 903. Although illustrated as being coupled to the bus 903, the memory 907 may be coupled to the processor 901.

The invention claimed is:

1. A method comprising:
   determining, based on program code from a disassembled first binary file, a plurality of intra-subroutine control flows, a set of one or more import code unit identifiers, and call relationships between subroutines of the program code and the set of import code unit identifiers;
   generating a plurality of signatures for the subroutines based, at least in part, on the plurality of intra-subroutine control flows;

generating a second signature based, at least in part, on the set of import code unit identifiers and the call relationships; and combining the plurality of signatures with the second signature as a representation of structure and import behavior of the first binary file.

2. The method of claim 1 further comprising determining a malicious or benign verdict for the first binary file based, at least in part, on the combination of the plurality of signatures with the second signature.

3. The method of claim 1, wherein generating the plurality of signatures for the subroutines comprises, for each subroutine:

creating a representation of the subroutine that identifies basic blocks of the subroutine, that indicates size of each basic block, and that indicates control flow among the basic blocks based on the one of the plurality of intra-subroutine control flows corresponding to the subroutine; and hashing the subroutine representation to generate the one of the plurality of signatures corresponding to the subroutine.

4. The method of claim 3, wherein creating the representation that indicates control flow comprises creating the representation to indicate at least one of types of jumps in the basic blocks and successor blocks of the basic blocks.

5. The method of claim 3, wherein creating the representations comprises normalizing identifiers of the basic blocks.

6. The method of claim 5, wherein normalizing identifiers of the basic blocks comprises, for each basic block of a subroutine, determining an offset of the basic block relative to a beginning of the corresponding subroutine.

7. The method of claim 1, further comprising:

forming a signature vector with the plurality of signatures, wherein combining the plurality of signatures with the second signature comprises associating the signature vector with the second signature.

8. The method of claim 7, wherein forming the signature vector comprises:

deterministically ordering the plurality of signatures in the signature vector.

9. The method of claim 1 further comprising generating clusters based on combined signatures of sample binary files and corresponding verdicts, wherein the combined signatures include the combined plurality of signatures and the second signature and the sample binary files include the first binary file.

10. The method of claim 9, wherein generating the clusters comprises:

generating fuzzy representations of each of the combined signatures;

clustering the fuzzy representations; and for each cluster, indicating a malicious or benign verdict based, at least in part, on verdicts of cluster members.

11. The method of claim 1 further comprising:

for each import code unit, determining which of the subroutines calls the import code unit; and associating the signature of each caller subroutine with the import code unit, wherein generating the second signature comprises generating the second signature based, at least in part, on associations of the set of import code units with the signatures of caller subroutines.

12. The method of claim 11, wherein generating the second signature further comprises, for each import code unit, determining a quantity of call sites in each caller subroutine, wherein the second signature is also generated based on the quantity of call sites.

13. The method of claim 1 further comprising:

generating a first file signature of the first binary file; and determining that the first file signature does not have a match in a cache of binary file signatures, wherein generating the plurality of signatures, generating the second signature, and combining the plurality of signatures with the second signature is based, at least in part, on determining that the first file signature does not have a match in the cache.

14. A non-transitory, machine-readable medium having program code stored thereon, the program code comprising instructions to:

based on program code generated from disassembly of a binary program code, create a control flow based representation of each subroutine;

generate a subroutine signature for each control flow based representation;

generate an import behavior signature based, at least in part, on an import table of the program code; and indicate an association of the subroutine signatures and the import behavior signature as a representation of structure and import behavior of the binary program code.

15. The machine-readable medium of claim 14, wherein the instructions to create the control flow based representations of the subroutines comprise instructions to:

for each subroutine, determine descriptors for each basic block including a normalized identifier of the basic block;

aggregate the basic block descriptors; and hash the aggregated basic block descriptors.

16. The machine-readable medium of claim 15, wherein the instructions to determine descriptors including a normalized identifier of each basic block of each subroutine comprise instructions to determine an offset of each basic block relative to a beginning of the corresponding subroutine and use the relative offset as the normalized basic block identifier.

17. The machine-readable medium of claim 15, wherein the descriptors for a basic block also comprise a basic block size, a jump type of the basic block, and indication of one or more successor basic blocks.

18. The machine-readable medium of claim 14, wherein the program code further comprises instructions to deterministically order the subroutine signatures in a data structure and to associate the data structure of deterministically ordered subroutine signatures with the import behavior signature.

19. The machine-readable medium of claim 14, wherein the instructions to generate the import behavior signature comprise instructions to:

determine caller-callee relationships between the subroutines and import code units indicated in the import table; and generate the import behavior signature based, at least in part, on indications of the caller-callee relationships, wherein the indications use corresponding ones of the subroutine signatures.

20. An apparatus comprising:

a processor; and a machine-readable medium having instructions stored thereon that are executable by the processor to cause the apparatus to, based on program code generated from disassembly of a binary program code, create a control flow based representation of each subroutine;

generate a subroutine signature for each control flow based representation;

generate an import behavior signature based, at least in part, on an import table of the program code; and indicate an association of the subroutine signatures and the import behavior signature as a functional representation of the binary program code.

21. The apparatus of claim 20, wherein the instructions to create the control flow based representations of the subroutines comprise instructions executable by the processor to cause the apparatus to:

for each subroutine, determine descriptors for each basic block including a normalized identifier of the basic block;

aggregate the basic block descriptors; and hash the aggregated basic block descriptors.

22. The apparatus of claim 20, wherein the instructions to generate the import behavior signature comprise instructions executable by the processor to cause the apparatus to:

determine caller-callee relationships between the subroutines and import code units indicated in the import table; and generate the import behavior signature based, at least in part, on indications of the caller-callee relationships that use corresponding ones of the subroutine signatures.

* * * * *